J. P. EUSTIS.
ADJUSTABLE SHAVING MIRROR.
APPLICATION FILED OCT. 31, 1907.

898,454.

Patented Sept. 15, 1908.

Witnesses:

Inventor
John P. Eustis.
By his Attorney
Geo. L. Wheelock

UNITED STATES PATENT OFFICE.

JOHN P. EUSTIS, OF NEWTON, MASSACHUSETTS.

ADJUSTABLE SHAVING-MIRROR.

No. 898,494.　　　Specification of Letters Patent.　　Patented Sept. 15, 1908.

Application filed October 21, 1907. Serial No. 400,104.

*To all whom it may concern:*

Be it known that I, JOHN P. EUSTIS, a citizen of the United States, residing at Newton, county of Middlesex, State of Massachusetts, have invented certain new and useful Improvements in Adjustable Shaving-Mirrors, of which the following is a specification.

This invention relates to adjustable shaving mirrors, and the objects of the same are to provide a shaving mirror which has preferably two joints, one adjacent the wall, and the other the mirror, the mirror joint being located in close juxtaposition to the mirror for the purpose of securing a desirable action and a neat, convenient and compact construction.

Figure 1:
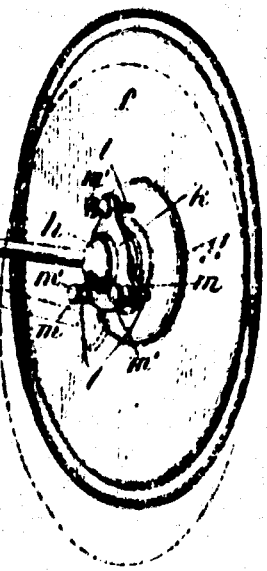
Figure 2:
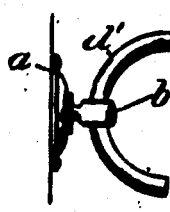
Figure 2:
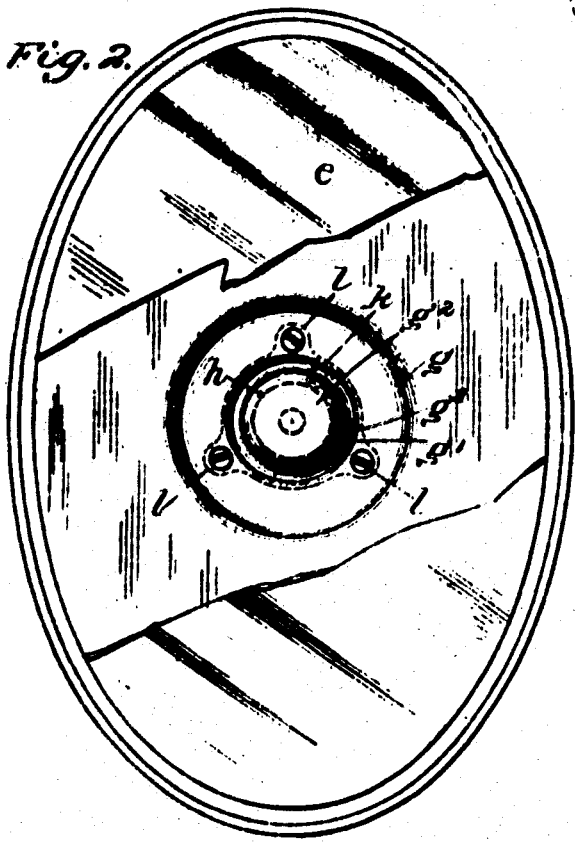
Figure 3:
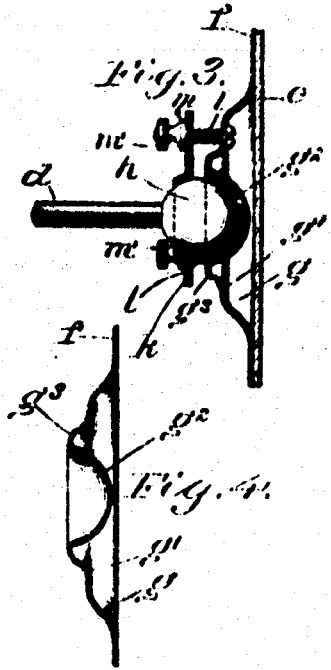
Figure 4:

In order that my invention may be fully understood, I will proceed to describe the same in connection with the accompanying drawings showing a desirable form of the invention, and in which, Figure 1 is a rear perspective view of the device, showing two positions, one in full lines, and another in dotted lines; Fig. 2 is a front elevation of the mirror, the glass being partly broken away; Fig. 3 is an enlarged detail view of the mirror joint; and Fig. 4 is a view of the joint portion of the back plate of the mirror.

The wall plate *a* secured to the wall or other vertical support in any desirable manner, has an eye or loop *b* which receives the crooked or curved rear end *d'* of a supporting arm *d*. By sliding the crook or bend *d'* in or out of the eye *b*, the arm *d* is adjusted at various angles, and this method of adjustment is not claimed as new, but it acts nicely and conveniently in combination with the form of joint to be described which supports the mirror from the arm.

The mirror *e* and the back plate thereof *f* are supported at various angles by means of a suitable ball and socket joint connecting the back plate with the supporting arm *d*. To this end the sheet metal back plate is preferably stamped up at its central portion so as to provide a rearwardly depressed portion *g* which flares out towards the back plate, an annular shoulder *g'*, a semispherical forwardly extending socket *g²*, and a return portion *g³* connecting the mouth of the socket with said shoulder. These parts struck up from the substance of the metallic back plate are clearly shown in Fig. 4. The use of these portions is clearly apparent from Fig. 3.

Here and in other figures of the drawings is shown a ball *h* on the inner end of the supporting arm *d*, which ball is confined or retained in the socket *g²* by means of a cap or socket member *k* embracing the ball near the arm *d*. This socket member or cap *k* is held substantially parallel with the plane of the back plate of the mirror by means of short bolts or screws *l*, which are passed through openings in the annular shoulder *g'*, with the heads of said screws bearing upon the inner side of said shoulder just behind the glass *e*. The outer ends of said screws *l* pass through holes in the socket member or cap and receive suitable retaining nuts *m* preferably provided with milled heads *m'*.

The socket *g²* is preferably lined with some soft material *n*, as cork, felt, or the like, so as to contact with the ball *h*. Obviously the ball and socket connection between the supporting arm and the back plate of the mirror is by this construction located or disposed approximately in the plane of the back plate, thereby locating the said joint close to the mirror. Such a construction of ball and socket joint is composed of few parts and is obviously compact, substantial and reliable, and enables the adjustment of the mirror into all desirable positions and places.

Having thus described a desirable form of the invention, what I claim as new therein and desire to secure by Letters Patent is:

1. In an adjustable mirror of the class having a ball-and-socket joint, the improvement, which consists in a sheet metal back-plate, having a rearwardly struck-up and depressed portion which flares out from the back-plate and is provided with a forwardly struck-up and depressed socket or cup for a ball joint, for substantially the purposes set forth.

2. In an adjustable mirror of the class having a ball-and-socket joint, the improvement which consists in a back-plate having a rearwardly depressed portion formed with an annular shoulder, a rearwardly opening ball cup or socket, and a return portion connecting the latter with said shoulder.

3. In an adjustable shaving mirror of the class having a ball-and-socket joint, the improvement which consists in a back-plate having a rearwardly depressed portion formed with an annular shoulder, a rearwardly opening ball-cup or socket, and a return-portion connecting the latter with said shoulder, all stamped up and formed out of a single metallic sheet, for substantially the purposes set forth.

4. In an adjustable mirror, the combination, with an arm having a ball at its outer end, of a back-plate having a rearwardly depressed portion formed with an annular shoulder provided with a forwardly depressed socket or cup for the said ball, said rearwardly depressed portion being also formed with a return portion connecting the socket with said annular shoulder, a socket-member or cap opposing said socket, and fastening screws passing through the back-plate and the socket-member or cap, the heads of the screws bearing upon the under side of said annular shoulder, for substantially the purposes set forth.

Signed at Boston, Mass. this 26 day of October, 1907.

JOHN P. EUSTIS.

Witnesses:
EDWARD W. CASEY,
THOMAS M. KEEFE.